(12) United States Patent
Iida et al.

(10) Patent No.: US 11,590,685 B2
(45) Date of Patent: Feb. 28, 2023

(54) FIBER AGGREGATION, SHORT FIBER AND METHOD OF MANUFACTURING THE SAME, AND FILM AND METHOD OF MANUFACTURING THE SAME

(71) Applicant: RICOH COMPANY, LTD., Tokyo (JP)

(72) Inventors: Sohichiroh Iida, Kanagawa (JP); Hitoshi Iwatsuki, Kanagawa (JP); Mitsuru Naruse, Shizuoka (JP); Satoshi Ogawa, Nara (JP); Yunsheng Sun, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/558,492

(22) Filed: Sep. 3, 2019

(65) Prior Publication Data

US 2020/0070468 A1    Mar. 5, 2020

(30) Foreign Application Priority Data

Sep. 3, 2018    (JP) .............................. JP2018-164235

(51) Int. Cl.
*B29C 51/02* (2006.01)
*B29B 11/16* (2006.01)

(52) U.S. Cl.
CPC .............. *B29C 51/02* (2013.01); *B29B 11/16* (2013.01)

(58) Field of Classification Search
CPC ......... B29C 51/02; B29C 70/50; B29B 11/16; B01J 35/06
See application file for complete search history.

(56) References Cited

U.S. PATENT DOCUMENTS

| | | | |
|---|---|---|---|
| 3,085,922 A | 4/1963 | Koller | |
| 7,794,647 B1 | 9/2010 | Deckard | |
| 10,526,749 B2 * | 1/2020 | Milton | B68G 1/00 |
| 2008/0023015 A1 * | 1/2008 | Arnold | D04H 1/74 |
| | | | 128/899 |
| 2009/0092833 A1 | 4/2009 | Schmitt et al. | |
| 2010/0260968 A1 | 10/2010 | Marissen et al. | |
| 2011/0143108 A1 | 6/2011 | Fruth et al. | |
| 2016/0160021 A1 | 6/2016 | Kojima et al. | |
| 2016/0177122 A1 | 6/2016 | Naruse et al. | |
| 2016/0236412 A1 | 8/2016 | Kusahara et al. | |
| 2016/0271877 A1 | 9/2016 | Suzuki et al. | |
| 2016/0271879 A1 | 9/2016 | Yamashita et al. | |
| 2016/0272776 A1 * | 9/2016 | Arai | C08G 69/22 |
| 2017/0209927 A1 | 7/2017 | Yamashita et al. | |

(Continued)

FOREIGN PATENT DOCUMENTS

| | | | |
|---|---|---|---|
| JP | 2540981 Y2 * | 7/1997 | ............... B26D 1/06 |
| JP | 2006-291373 | 10/2006 | |

(Continued)

OTHER PUBLICATIONS

Extended European Search Report dated Dec. 13, 2019 in Patent Application No. 19194849.6, 8 pages.

*Primary Examiner* — Jeffrey M Wollschlager
*Assistant Examiner* — Shibin Liang
(74) *Attorney, Agent, or Firm* — Grüneberg and Myers PLLC

(57) ABSTRACT

A fiber aggregation contains fiber containing a thermoplastic resin, each of the fiber being mutually joined and aligned.

20 Claims, 2 Drawing Sheets

(56) References Cited

U.S. PATENT DOCUMENTS

| | | |
|---|---|---|
| 2017/0217087 A1 | 8/2017 | Tamoto et al. |
| 2017/0225404 A1 | 8/2017 | Naruse et al. |
| 2017/0259459 A1* | 9/2017 | Okunaka ............. B29C 48/05 |
| 2018/0022024 A1 | 1/2018 | Saito et al. |
| 2018/0023219 A1 | 1/2018 | Saito et al. |
| 2018/0147780 A1 | 5/2018 | Kamoda et al. |
| 2018/0179668 A1* | 6/2018 | Topolkaraev ......... D01D 5/247 |
| 2018/0215917 A1 | 8/2018 | Naruse |
| 2018/0264720 A1 | 9/2018 | Tamoto et al. |
| 2018/0264721 A1 | 9/2018 | Iida et al. |
| 2018/0273756 A1 | 9/2018 | Saito et al. |
| 2018/0355144 A1 | 12/2018 | Saito et al. |
| 2019/0126538 A1 | 5/2019 | Fujita et al. |
| 2019/0134853 A1 | 5/2019 | Iwatsuki et al. |

FOREIGN PATENT DOCUMENTS

| | | |
|---|---|---|
| JP | 2008-231653 | 10/2008 |
| JP | 2009-235601 | 10/2009 |
| JP | 2018-015972 | 2/2018 |
| JP | 2018-086757 | 6/2018 |
| JP | 2018-111304 | 7/2018 |
| JP | 2018-149800 | 9/2018 |
| JP | 2018-154093 | 10/2018 |
| JP | 2018-154116 | 10/2018 |
| JP | 2018-158571 | 10/2018 |
| JP | 2019-001154 | 1/2019 |
| JP | 2019-084815 | 6/2019 |
| JP | 2019-084816 | 6/2019 |
| JP | 2019-084817 | 6/2019 |
| JP | 2019-084820 | 6/2019 |
| JP | 2019-119162 | 7/2019 |
| JP | 2019-135092 | 8/2019 |
| WO | WO2005/012607 A1 | 2/2005 |
| WO | WO2008/057844 A1 | 5/2008 |
| WO | WO2017/112723 A1 | 6/2017 |

* cited by examiner

FIBER AGGREGATION, SHORT FIBER AND METHOD OF MANUFACTURING THE SAME, AND FILM AND METHOD OF MANUFACTURING THE SAME

CROSS-REFERENCE TO RELATED APPLICATIONS

This patent application is based on and claims priority pursuant to 35 U.S.C. § 119 to Japanese Patent Application No. 2018-164235, filed on Sep. 3, 2018, in the Japan Patent Office, the entire disclosures of which are hereby incorporated by reference herein.

BACKGROUND

Technical Field

The present invention relates to fiber aggregation, short fiber, a method of manufacturing the short fiber, a film, and a method of manufacturing the film.

Description of the Related Art

As fiber aggregation, unwoven fabric manufactured by entangling long fiber, woven fabric manufactured by weaving warp and woof, and knitted fabric manufactured by knitting fiber are widely known.

In such fiber aggregation, when cutting the fiber aggregation to obtain short fiber, the length of the short fiber varies widely because the fiber in a fiber sheet in any of the fiber aggregation is aeolotropic.

SUMMARY

According to embodiments of the present disclosure, provided is a fiber aggregation which contains fiber containing a thermoplastic resin, each of the fiber being mutually joined and aligned.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

Figure 1:
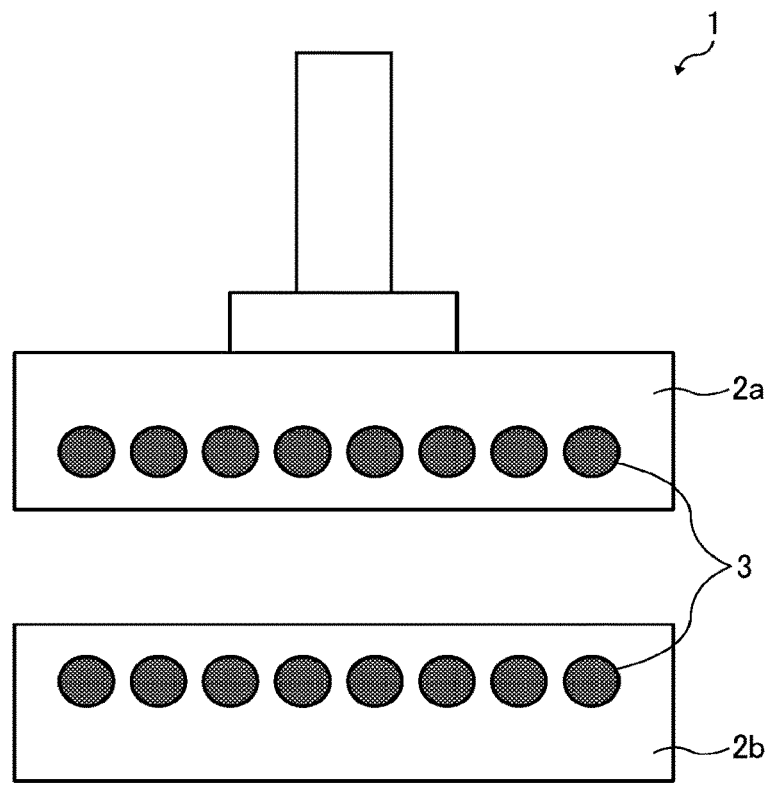
FIG. 1 is a schematic diagram illustrating an example of a heat press device according to an embodiment of the present disclosure.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc., in the present disclosure represent the same meaning, unless otherwise specified.

Embodiments of the present invention are described in detail below with reference to accompanying drawing(s). In describing embodiments illustrated in the drawing(s), specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

According to the present disclosure, provided is fiber aggregation which is capable of obtaining short fiber shorter than typically obtained and efficiently producing short fiber and film with targeted dimensions.

To obtain short fiber having lengths with less variety, for example, a method of manufacturing short fiber free of impurities has been proposed in, for example, JP-5410687-B1 (JP-2009-235601-A1) in which a bundle of long fiber is placed on a sheet and only the bundle of long fiber is cut.

Fiber Aggregation

The fiber aggregation of the present disclosure contains fiber containing at least a thermoplastic resin and the fiber is mutually joined and aligned in the fiber aggregation.

The fiber aggregation of the present disclosure is based on the knowledge that, in typical technologies, when fiber aggregation is cut to obtain short fiber and if the fiber can freely move and the fiber is not aligned, the short fiber length varies widely due to the cutting, thereby making it difficult to cut the fiber to a target dimension, which is ineffective.

Fiber aggregation is typically formed by entangling fiber or binding fiber with a binder. The fiber in such fiber aggregation is directed at random, has a high porosity, or is weakly attached to each other. Therefore, it is difficult to obtain fiber having a uniform fiber length at the time of cutting. In addition, due to the same reason, it is difficult to obtain ultra-short fiber in the order of micrometer.

Moreover, variation of fiber length or miscut such as two-time cutting is ascribable to movement of a bundle of fiber at the time of cutting. To avoid this and efficiently and stably obtain short fiber, the present inventors have found that it is suitable to firmly fix a bundle of fiber at the time of cutting.

For example, the methods proposed in JP-4435738-B1 (WO2005/012607 A1) and JP-4567509-B1 (JP-2006-

291373-A1) are effective to fix a bundle of fiber. In particular, the method proposed in JP-4435738-B1 mentioned above using water as an embedding agent can enhance the power of fixing a bundle of fiber and reduce the variation of the fiber length and miscut such as two-time cutting. Moreover, it obviates the need for using a binder component to fix a bundle of fiber and a fixing sheet to fix the bundle can be easily removed after cutting. Therefore, this is preferable to prevent contamination of impurities.

However, the present inventors have found that these methods involve practical problems with low efficiency and expensive cost, and moreover properties such as flowability of a resin having good water-absorption are not good due to water-absorption when powdered. A cause of this is that the amount of fiber is limited when the fiber is bundled at the time of cutting. If a large amount of fiber is fixed and cut once, productivity is good and the cost can be reduced. According to typical methods, a bundle of fiber may be fixed but the amount of the fiber that can be cut is limited. Therefore, productivity is low and production time is prolonged, which leads to inhibition of widespread use. In addition, it takes a lot of time and heat to remove water and dry the fiber, which is another cause of productivity decline.

Moreover, the fixing method using foreign matter as proposed in JP-5300231-B1 (JP-2008-231653-A1) and JP-4567509-B1 (JP-2006-291373-A1) mentioned above provides enough power to fix a bundle of fiber so that miscut does not easily occur. However, it involves a problem with separation of cur powder and the fixing component, which degrades productivity and makes it impossible to eliminate contamination of the powder.

Therefore, to solve these problems involving with typical fiber aggregation, the fiber aggregation of the present disclosure contains fiber containing at least a thermoplastic resin and the fiber is mutually joined. Also, each fiber in the fiber aggregation is aligned. According to this fiber aggregation, it is possible to obtain short fiber in comparison with typical fiber, which efficiently produces short fiber and film with targeted dimensions.

Fiber

The fiber constituting the fiber aggregation of the present disclosure contains at least a thermoplastic resin and can be formed of only a thermoplastic resin and may optionally contain an additive.

The proportion of the thermoplastic resin in the resin is not particularly limited and can be suitably selected to suit to a particular application. It is preferably 50 percent by mass or more, more preferably 75 percent by mass or more, furthermore preferably 90 percent by mass or more, and may be 100 percent by mass.

Thermoplastic Resin

In generally, thermoplastic resins have plasticity and are softened when heated and solidified when cooled.

The thermoplastic resin preferably has a melting point of 100 degrees C. or higher as measured according to ISO 3146 regulation. It is preferable that the melting point of the resin powder as measured according to ISO 3146 regulation be 100 degrees C. or higher because it is within the heat resistance temperature range for exteriors of products, etc.

The melting point can be measured according to ISO 3146 regulation (plastic transition temperature measuring method, JIS K7121 format) utilizing differential scanning calorimetry (DSC). When a plurality of melting points exist, the melting point on the higher temperature side is used.

The thermoplastic resin has no particular limit and can be suitably selected to suit to a particular application.

Specific examples include, but are not limited to, polyolefin, polyamide, polyester, polyther, polyarylketone, a liquid crystal polymer (LCP), polyacetal (POM), polyimide, a fluorochemical resin, and polyphenylene sulfide. These can be used alone or in combination.

Specific examples of the polyolefine include, but are not limited to, polyethylene (PE) and polypropylene (PP). These can be used alone or in combination.

Specific examples of the polyamide include, but are not limited to, polyamide 410 (PA410), polyamide 6 (PA6), polyamide 66 (PA66), polyamide 610 (PA610), polyamide 612 (PA612), polyamide 11 (PA11), polyamide 12 (PA12), semi-aromatic polyamide 4T (PA4T), polyamide MXD6 (PAMXD6), polyamide 6T (PA6T), polyamide 9T (PA9T), and polyamide 10T (PA10T). These can be used alone or in combination.

Of these, PA9T is also referred to as polynonane methylene terephthal amide and constituted of a diamine having 9 carbon atoms and a terephthalic acid. In general, since the carbon acid side is an aromatic series, PA9T is referred to as semi-aromatic series. Moreover, as a whole aromatic series in which both carboxylic acid side and diamine side are aromatic, aramid constituted from p-phenylenediamine and a terephathalic acid is also included as polyamides.

Specific examples of the polyester include, but are not limited to, polyethyleneterephthalate (PET), polybutylene terephthalate (PBT), and polylactic acid (PLA). To impart heat resistance, polyester including aromatic series partially including terephthalic acid and isophthalic acid is also suitably used.

Specific examples of the polyether include, but are not limited to, polyether etherketone (PEEK), polyetherketone (PEK), polyether ketone ketone (PEKK), polyaryl ether ketone (PAEK), polyether ether ketone ketone (PEEKK), and polyetherkeone ether ketone ketone (PEKEKK). These can be used alone or in combination.

The thermoplastic resin is preferably a crystalline resin. The crystalline resin has a melting peak as measured according to ISO 3146 regulation (plastic transition temperature measuring method, JIS K7121 format).

Specific examples of the crystalline resin include, but are not limited to, polybutylene terephthalate (PBT), polyetheretherketone (PEEK), and polyamide 12 (PA12). These can be used alone or in combination.

Of these, a crystal-controlled crystalline thermoplastic resin is preferable. Such a crystalline thermoplastic resin having a crystal size and a controlled crystal alignment can be obtained by a method of applying external stimuli such as heat, drawing, crystal nuclear material, and ultrasonic treatment.

Of these, it is preferable to draw a crystalline thermoplastic resin. The method of manufacturing short fiber of the present disclosure includes manufacturing fiber aggregation and cutting fiber short so that it is preferable to use fiber which is previously drawn crystalline thermoplastic resin to obtain short fiber containing a crystalline resin. A typical method of manufacturing short fiber does not provide short fiber containing a crystalline resin. Therefore, in the present disclosure, to make a thermoplastic resin into fiber, it is effective to employ the method mentioned above, in particular, the method of controlling crystallinity by drawing and manufacturing short fiber using the drawn thermoplastic resin.

For the drawing, for example, using an extruder, melted resin is drawn in a fibrous form during stirring at a temperature 30 degrees C. or greater higher than the melting point. To be specific, a melted resin can be drawn to around 1/1 to around 1/10 to obtain fiber.

The form and the fiber diameter of the cross section of the fiber depends on the form of the nozzle orifice of the extruder. Productivity is expected to increase in proportion to the number of nozzles.

Additive Such an additive is not particularly limited and can be suitably selected to suit to a particular application. For example, an antioxidant, a flame retardant, an inorganic reinforcing agent, a fluidizer, a plasticizer, a crystal nucleating agent, etc. can be added.

The additive may be mixed with the thermoplastic resin before or after short fiber is obtained.

Such an antioxidant is not particularly limited, can be suitably selected to suit to a particular application, and includes so-called deterioration inhibitor and stabilizer. Examples include, but are not limited to, hydrazide-based compounds and amide-based compound, which are metal deactivators, phenol-based compounds (hindered phenol-based compounds) and amine-based compounds that are radical scavengers, phosphate-based compounds and sulfur-based compounds that are peroxide decomposers, and triazine-based compounds that are ultraviolet light absorbers. These can be used alone or in combination.

Of these, a combination of a radical scavenger and a peroxide decomposer is preferable in terms of the antioxidant effect.

In addition, to diminish degradation of short fiber, it is preferable to previously add an antioxidant to the fiber.

Examples of the flame retardant include, but are not limited to, halogen-based, phosphorine-based, inorganic hydrated metal compound-based, nitrogen-containing, and silicone-based retardants. These can be used alone or in combination. If two or more flame retardants are used in combination, the combination of halogen-based and inorganic hydrated metal compound-based flame retardants is preferable to enhance flame retardancy.

Flame retardancy of short fiber can be evaluated by, for example, JIS K6911 format, JIS L1091 format (ISO 6925 regulation), JIS C3005 format, and the pyrogen test (using a cone calorimeter).

The proportion of the flame retardant in total amount of the fiber aggregation is preferably from 1 to 50 percent by mass and more preferably from 10 to 30 percent by mass to further enhance flame retardancy. When the proportion is within the above-specified range, flame retardancy will be sufficient.

The inorganic reinforcing agent is added to increase the strength. For example, inorganic fibrous materials such as glass fiber, carbon fiber, and aramid fiber, inorganic laminar silicates such as talc, mica, and montmorillonite, glass beads, aluminum balls, and articles specified in WO-2008-057844-A1. Addition of an inorganic reinforcing agent contributes to enhancing flame retardancy. It is also preferable in terms of striking a balance between strengthening physical property and flame retardancy.

The fluidizer partially or entirely covers the surface of the fiber to improve flowability of the resin powder. If flowability of the fiber increases, surface smoothness of the powder layer during recoating increases. In addition, voids in the fiber are reduced, which makes it possible to further improve surface property, dimension accuracy, and strength of a solid freeform fabrication object. It is preferable that such a fluidizer cover the surface of the fiber. However, the fluidizer may be partially embedded in the fiber.

The average primary particle diameter of the fluidizer is preferably 500 nm or less and more preferably 50 nm or less. When the average primary particle diameter is in this range, the covering ratio of the surface of the fiber by fluidizer can be increased so that voids can be reduced in addition to the enhancement of flowability.

There is no specific limit to the fluidizer and it can be suitably selected to suit to a particular application. For example, spherical inorganic particles are preferable and a metal oxide is more preferable.

Specific examples of the fluidizer include, but are not limited to, silica, alumina, titania, zinc oxide, magnesium oxide, tin oxide, iron oxide, and copper oxide. These can be used alone or in combination. Of these, silica and titania are preferable.

The fluidizer having a hydrophobized surface is preferably used. There is no specific limit to the hydrophobizing method and known methods can be suitably selected.

Specific examples of the hydrophobizing agent include, but are not limited to, silane coupling agents such as hexamethyl disilazane (HMDS) and dimethyldichlorosilane (DMDS) and silicone oil treating agents such as dimethyl silicone oil and amino-modified silicone oil.

Of these, silane coupling agent are preferably used.

The processing amount of the hydrophobizing agent is preferably from 2 to 6 $mg/m^2$ per surface area of the fiber.

The proportion of the fluidizer in the resin powder is preferably from 0.05 to 3 percent by mass and more preferably from 0.1 to 1.5 percent by mass. When the proportion is within the range specified above, flowability of the fiber can be improved and at the same time the impact of reduction of filling density ascribable to an increase of voids can be minimized, which is preferable.

A known powder mixer is used in the mixing and coating processes of the fluidizer with the fiber. A mixer equipped with a jacket, etc. is preferably used to control the temperature of the inside of the mixer. In addition, it is possible to arbitrarily change the rotational frequency, speed, time, temperatures, etc. of the powder mixer.

Specific examples of the powder mixer include, but are not limited to, V-type mixers, Henschel mixers, Rocking mixers, Nautor mixers, and Super mixers.

The fiber aggregation of the present disclosure is cut to efficiently obtain short fiber. To obtain such short fiber, in the manufacturing process of fiber aggregation, it is preferable to form such a hard fiber aggregation that fiber is attached to each other and does not bend when held by hand and more preferable to make such a hard fiber aggregation into a sheet-like form. A fiber aggregation having a high porosity moves at the invasion of a blade at the time of cutting and causes variation in the cutting fiber length, which is not preferable. That is, small porosity of fiber aggregation is preferable. As the porosity decreases, production efficiency increases, which is advantageous to cost reduction. According to the present disclosure, fiber can be easily fixed at high density in a short time, which makes it possible to strike a balance between quality improvement and productivity improvement to obtain short fiber.

Therefore, the porosity of the fiber aggregation of the present disclosure is preferably 40 percent by volume or less, more preferably 30 percent by volume or less, and furthermore preferably from 5 to 25 percent by volume.

Porosity can be calculated based on the volume and the mass of fiber aggregation.

Using a ruler, the height, the width, and the depth of fiber aggregation are measured and multiplied to calculate the volume of the fiber aggregation. The mass of the fiber aggregation is divided by the volume to obtain the density of the fiber aggregation. The density of the fiber aggregation is subtracted from the true density of a resin constituting fiber aggregation and the result is divided by the true density of the resin to calculate the porosity of the fiber aggregation.

The diameter (fiber diameter) of the fiber for use in the fiber aggregation is preferably from 1 to 150 μm and more preferably from 3 to 130 μm.

When the fiber diameter is within this range, heat transfer is suitable, thereby forming even fiber aggregation. When the fiber diameter is less than 1 μm, heat transfer is quick, thereby melting the fiber quick, so that it is not easy to maintain the form of the fiber. In addition, when the diameter of the fiber surpasses 150 μm, heat transfer is slow, so that heat is not transferred evenly while manufacturing fiber aggregation, which prevents manufacturing of even fiber aggregation.

The orientation of each fiber of fiber aggregation is required to be the same. When the fiber is aligned, the fiber length obtained at the time of cutting fiber aggregation is uniform.

"Alignment of fiber" is defined by the ratio of the surface roughness Ra. The ratio is defined by the surface roughness of the fiber in the fiber axis direction and the surface roughness of the fiber in the fiber diameter direction. When the surface roughness in the fiber axis direction is defined as Y and the surface roughness in the direction perpendicular to the fiber axis direction is defined as X, the ratio (X/Y) is preferably 1.2 or greater, more preferably 1.5 or greater, and furthermore preferably 1.7 or greater.

The surface roughness of the fiber aggregation can be measured by three-dimensional measuring device (VR-3200, manufactured by KEYENCE CORPORATION). Fiber aggregation is placed on a measuring board and representative fiber is selected and the surface roughness Ra of the fiber in the fiber axis direction is defined as Y and the surface roughness Ra of the fiber in the direction perpendicular to the fiber axis direction is defined as X. Each of X and Y are measured three times and the average is calculated to obtain the ratio (X/Y). For unwoven fabric, woven fabric, and knitted fabric, the alignment of fiber is not identifiable. Therefore, an arbitrary direction is defined as Y and the direction perpendicular to Y is defined as X and the surface roughness is measured in the same manner to calculate the ratio (X/Y).

The form of the fiber aggregation is not particularly limited and can be suitably selected to suit to a particular application. The form is preferably a sheet-like form, more preferably a sheet-like form with less warp, and furthermore preferably a sheet-like form having a hardness to a degree that the form is not easily collapsed by an external force.

The fiber aggregation is formed of fiber and may include an adhesive to enhance attachment between fiber. The fiber aggregation may be preferably formed of only fiber to suit to a particular application.

Examples of the adhesive include, but are not limited to, polyvinyl alcohol (PVA), polyvinyl pyrrolidone, polyamide, polyacrylic amide, polyethylene imine, polyethylene oxides, polyacrylate resins, cellulose resins, and gelatin. These can be used alone or in combination.

Method of Manufacturing Fiber Aggregation

The method of manufacturing fiber aggregation for use in the present disclosure includes cutting a thermoplastic resin into long fiber having an arbitrary dimension (long fiber cutting process), placing this long fiber (placing process), joining fiber to obtain fiber aggregation as heat press process, and an optional process of smoothing the fiber.

Instead of heat press process in the method of manufacturing fiber aggregation, it is possible to join fiber with an adhesive, resin, etc.

Long Fiber Cutting Process

In the long fiber cutting process, fiber containing a thermoplastic resin is cut into a desired length. This length is defined as the length in the longitudinal direction of the fiber aggregation. When cutting a bundle of fiber such as multifilament, it is possible to cut fiber under low load without entanglement. For example, it is preferable to use an ultrasonic cutter.

Placing Process

The long fiber formed in the long fiber cutting process is aligned and placed operable in the following process of the heat press process. After placing, the fiber arrangement direction may be aligned using a comb. In addition, the fiber is twined to make it thick, thereby enhancing rigidity to improve alignment.

In addition, a bundle of fiber can be directly placed on a heat press device. It is preferable to use paper liner or a mold in combination. Paper liner is placed top and bottom of a bundle of fiber to be pressed to prevent the fiber from adhering to the heat press device after pressing.

Figure 2A:
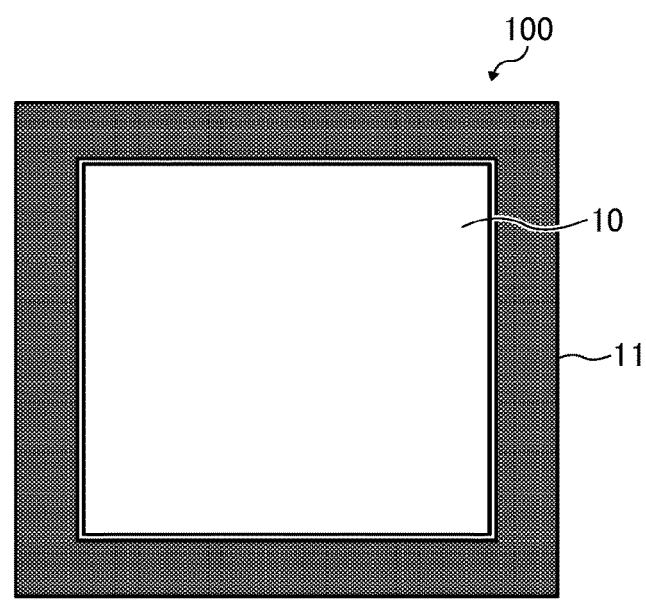
FIG. 2A is a schematic diagram illustrating a top view of an example of a mold for use in an embodiment of the present disclosure.
Figure 2B:
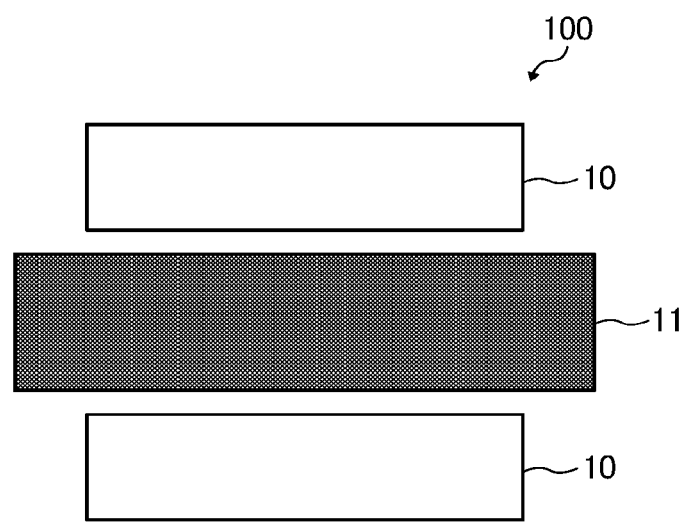
FIG. 2B is a schematic diagram illustrating a side view of an example of a mold for use in an embodiment of the present disclosure.
Figure 2C:
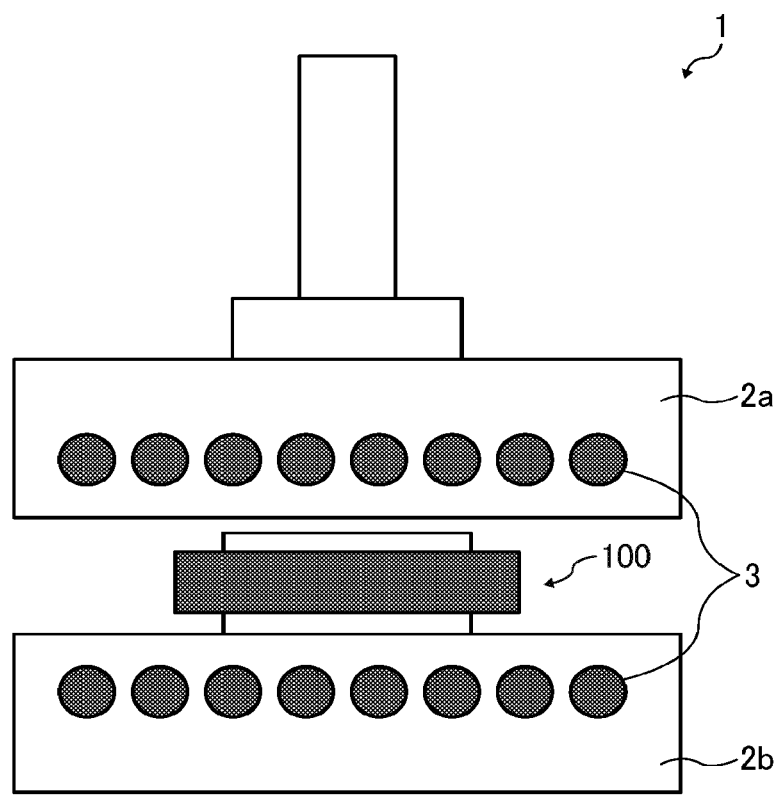
FIG. 2C is a schematic diagram illustrating a state in which an example of a mold for use in an embodiment of the present disclosure is set in a heat press device.

The mold is not particularly limited and can be suitably selected to suit to a particular application. A mold 100 illustrated in FIGS. 2A to 2C is preferable. FIG. 2A is a diagram illustrating a top view of the mold 100 and FIG. 2B is a diagram illustrating a side view of the mold 100. The mold 100 illustrated in FIGS. 2A to 2C is formed of two sheets 10 and a mold form 11. The two sheets 10 can be fit inside the mold form 11. A bundle of fiber is set between the two sheets 10 side by side and thereafter pressed. FIG. 2C is a schematic diagram illustrating a heat press device 1 in which the mold 100 is located. Note that the mold form 11 of the mold 100 and the material of the sheet 10 is preferably metal. Iron, steel, aluminum, and alloys thereof are more preferable.

Heat Press Process

In the heat press process, it is preferable that the fiber placed in the placing process be subjected to heat-pressing to mutually join fiber and obtain fiber aggregation formed of fiber. Due to the heat press process, the fiber is aligned to mutually join fiber to obtain fiber aggregation. The heat press process is also referred to as a hot press process.

Due to the heat press process, it is possible to manufacture fiber aggregation in which fiber is mutually joined. By directly joining fiber, the power of fixing fiber is increased, thereby manufacturing fiber aggregation having a strength. In the heat press process, an additive or resin can be added to help mutual joining of fiber.

Fiber mutually joined according to the heat press process is suitable to enhance quality of short fiber. However, it is not preferable to completely melt the fiber depending on purposes. In particular, this is not preferable when cutting fiber aggregation to obtain short fiber. If fiber aggregation obtained by the heat press process has a transparent region, the transparent region melts faster so that it may not be possible to collect the fiber as separated short fiber after cutting. Therefore, it is preferable to suitably control the temperature and the pressure during heat press.

The pressure (heat press) applied during heat press is not particularly limited and can be suitably selected to suit to a resin type and a particular application of fiber aggregation. The pressure is preferably from 0.01 to 20 MPa and more preferably from 0.1 to 10 MPa. When the pressure is within this range, fiber adheres to each other and the obtained fiber aggregation has strength enough to keep the form when carrying the fiber. That is, this range is preferable because workability is excellent. In addition, when this pressure is too high, fiber fuses and adheres to each other so that the fiber cannot maintain its form. Therefore, it is preferable to suitably set the pressure. The pressure is calculated by dividing the actual load (unit: N) applied to a target fiber aggregation with the actual area (unit: $m^2$) of the target fiber aggregation. The heating temperature (pressing temperature) in the heat press process is not particularly limited and can be suitably selected to suit to a particular application. Preferably, a thermoplastic resin to be used softens, fiber adheres to each other and at the same time fiber does not completely melted at the temperature. Specifically, the temperature is preferably the melting point of the thermoplastic resin or below.

When the heating temperature is within this range, fiber adheres to each other and the obtained fiber aggregation is strong enough to keep the form when carrying the fiber. That is, this range is preferable because workability is excellent.

The time (pressing time) during the heat press process is not particularly limited and can be suitably selected to suit to a particular application. The time is preferably from 1 second to 24 hours, more preferably from 1 minute to 6 hours, and particularly preferably from 3 minutes to 30 minutes.

When the time is within this range, the fiber fuses and adheres to each other and the obtained fiber aggregation having a sheet like-form is strong enough to keep the form when carrying the fiber. That is, this range is preferable because workability is excellent. In addition, since the fiber is not completely melted, it is possible to cut the fiber to obtain short fiber, film (resin film), and a resin plate. It is preferable that the time be set to suit to a particular application.

The method of measuring the melting point is not particularly limited and can be suitably selected to suit to a particular application. For example, a specific method is a differential scanning calorimetry (DSC). In the present disclosure, the endothermic peak appearing in the DSC chart is identified as the melting point.

FIG. 1 is a schematic diagram illustrating an example of a heat press device for use in the present disclosure. A heat press device 1 includes a pair of heating plates 2a and 2b located top and bottom and each of the heating plates 2a and 2b includes a heater 3 inside thereof. For actual heat press, for example, the heating plate 2a is once moved and fiber is arranged and aligned on the heating plates 2b. Thereafter, the heating plate 2a is lowered and the fiber is pressed at a particular temperature, pressure, and time. Thereafter, the heating plate 2a is elevated to take out the pressed fiber aggregation (fiber aggregation having a sheet-like form). The heat press method is not particularly limited and can be suitably selected to suit to a particular application. For example, the marketed heat press device, that is, the pressing device including a heater, is used to execute heat press.

The heat press device is not particularly limited and can be suitably selected to suit to a particular application. For example, specific examples include a heat press device of a liquid pressure pressing type using water and oil and a heat press device of mechanical pressing type using a mechanical drive mechanism. Various devices are available on the market ranging from small-sized to large-sized. Of these, in terms of high-performance processing without requiring a high pressure, a heat press device of the mechanical press type is preferable.

The method of fixing a heat pressing device (heat press) is not particularly limited and can be suitably selected to suit to a particular application. For example, a device sandwiching a target with heating plates, a device of a roller type heating and applying a pressure while sandwiching a target with two heated rollers, a device of a conveyor-belt type heating and applying a pressure while sandwiching a target between two steel conveyor belts.

The heating method executed by the heat press device has no particular limit and can be suitably selected to suit to a particular application. For example, devices employing an oil heat method, a steam method, a warm water circulating method, and a conducting method are suitable. Moreover, the heat pressing device includes a type of pressing in the air and a type of pressing in the vacuum, which are also usable in the present disclosure.

Using a mold during heat press is suitable to make a long fiber aggregation having an even thickness. Without a mold, the fiber tends to fall outside, which makes a thinner portion. After pressing the fiber, the attachment force of the fiber of that portion tends to be weakened, softened, or loosened, which leads to collapse of the fiber aggregation. As a result, the movement of the fiber during cutting increases, variation of the fiber length or frequency of miscut increases, which easily invites deterioration of efficiency of acquiring short fiber.

In addition, the usage of a mold prevents uneven and sudden cooling of the fiber aggregation after pressing. If the fiber aggregation is unevenly and suddenly cooled after pressing, the fiber aggregation formed of a bundle of fiber warps, which increases variation of the fiber length and frequency of miscut. Therefore, to reduce variation of the fiber length and frequency of miscut and obtain desired short fiber with high efficiency, it is suitable that the fiber aggregation obtained in the manufacturing process of the fiber aggregation is not breakable by hands or free of warp. Taking these into account, using a mold is effective.

Smoothing Process

In the smoothing process, the temperature and the pressure are controlled to smooth an obtained fiber aggregation.

It is preferable that fiber aggregation having a sheet-like form be free of warp. A large warp causes the entire fiber aggregation to move at the cutting to obtain short fiber, which increases frequency of miscut.

The warp of the fiber aggregation having a sheet-like form can be controlled by temperature-falling speed, etc. after the heat press process.

FIELD OF APPLICATION

High density fiber aggregation in which fiber is aligned is cut to obtain the fiber aggregation of the present disclosure having evenly short fiber or film with high productivity. In addition, while maintaining and cutting out fiber connection of the fiber aggregation, aligned material can be provided. Therefore, it is possible to apply the fiber aggregation to a wide range of application, including packaging material, aeolotropic strengthened material, light-transmissive resin sheet material, etc.

Aeolotropic Strengthened Material Fiber aggregation can be used as the aeolotropic strengthened material. The fiber aggregation is aligned and the fiber is fused and attached. Therefore, the strength of the fiber aggregation along the fiber direction and the strength along the direction perpendicular to the fiber direction has a large difference. Therefore, the strength along the fiber direction is high but the strength along the perpendicular direction is extremely weak. For example, this can be suitably used as an exterior material forming a border exterior such as balcony connected to a next-door neighbor, which is broken in the case of emergency to make an escape route.

To be used as an aeolotropic strengthened material, it is preferable to select respective conditions in the heat press process in the method of manufacturing fiber aggregation in accordance with the type of resin or desired strength.

Light-Transmissive Resin Sheet

The fiber aggregation can be used as light-transmissive resin sheet. It is possible to impart light transmission property to fiber aggregation depending on the manufacturing condition in the heat press process. This is possible because the fiber aggregation maintains the fiber form. Therefore, light-transmissive resin sheet can be used for articles requiring light transmission properties. For example, it can be used as an exterior.

To be used as a light-transmissive resin sheet, it is preferable to select respective conditions in the heat press process in the method of manufacturing fiber aggregation in accordance with the type of resin or desired light transmission. In particular, as the heating temperature becomes high, light transmission property is enhanced. Therefore, it is preferable to set the heating temperature in accordance with desired properties.

Application of Fiber Aggregation

The fiber aggregation of the present disclosure is not particularly limited and can be used for various applications. For example, it is suitably used for manufacturing short fiber, film, particles, etc.

Method of Manufacturing Short Fiber

The method of manufacturing short fiber includes mutually joining fiber containing a thermoplastic resin to manufacture a fiber aggregation, cutting the fiber aggregation into short fiber, and other optional process.

Short fiber can be obtained with high efficiency by cutting the fiber aggregation. Since the fiber aggregation has a low porosity in comparison with typical fiber aggregation, short fiber can be manufactured with a high productivity. Also, since the fiber direction is aligned, when the fiber is cut, short fiber having the same length can be obtained with a high efficiency. Moreover, the fiber aggregation is fused and attached to each other, so that the fiber does not move during cutting. Therefore, the fiber can be cut with high precision, which makes it possible to obtain ultra-short fiber having a size in the order of micrometer. The short fiber can be used for any application such as raw material for unwoven fabric, additive fillers, and powder for three-dimensional fabrication.

It is preferable to execute the process of manufacturing fiber aggregation in the method of manufacturing short fiber by the heat press method in the same manner as the method of manufacturing the fiber aggregation for use in the present disclosure The heating temperature in the heat press method is not particularly limited and can be set in accordance with the type of a thermoplastic resin and the cutting method. The heating temperature is preferably set 15 degrees C. or more below the melting point of a thermoplastic resin. When the heating temperature is high, fiber is fused and short fiber obtained by cutting is attached to short fiber adjacent thereto.

The ratio (Mv/Mn) of the mean volume diameter Mv to the mean number diameter (Mn) of the short fibers is preferably 1.5 or less and more preferably 1.2 or less.

The mean volume diameter (Mv) of the short fiber represents the average length of the short fiber and is preferably 150 μm or less, more preferably 100 μm or less, and furthermore preferably 50 μm or less.

The mean volume diameter (Mv) and the mean number diameter (Mn) of the short fiber can be measured by, for example, a dry (air) method without using a solvent with a particle size distribution measuring device (microtrac MT3300EXII, manufactured by MicrotracBEL Corp.) utilizing the refractive index of the short fiber to calculate the ratio.

Method of Manufacturing Film

The method of manufacturing film of the present disclosure includes a fiber aggregation manufacturing process to manufacture fiber aggregation made by mutually joined fiber containing at least a thermoplastic resin and a film-forming process of obtaining a film by cutting the fiber aggregation to a desired size, and other optional processes.

A film having high molecular orientation can be obtained by cutting the fiber aggregation. In the fiber aggregation, fiber is aligned and each filament of fiber has high molecular orientation so that when such fiber aggregation is cut, it is possible to obtain a highly aligned film. Such aligned film can be used for arbitrary purposes such as packaging materials and electronic component materials.

It is preferable to execute the process of manufacturing fiber aggregation in the method of manufacturing film by the heat press method in the same manner as in the method of manufacturing the fiber aggregation for use in the present disclosure in terms of acquiring aligned film.

The heating temperature in the heat press method is not particularly limited and can be set in accordance with the type of the thermoplastic resin and the film cutting method. The heating temperature is preferably set at the same temperature as or below the melting point of the thermoplastic resin. As the heating temperature becomes high, the fusion between fiber proceeds and the strength of the film obtained by cutting is enhanced, which is preferable. However, as the heating temperature becomes high and the heating time decreases, the degree of orientation decreases. Therefore, it is preferable to arbitrarily set the heating temperature to suit to a particular application.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples but is not limited thereto.

Example 1

Using an extruder (manufactured by The Japan Steel Works, LTD.), pellets of polybutylene terephthalate (PBT) resin (NOVADURAN® 5020, melting point of 218 degrees C., glass transition temperature of 43 degrees C., manufactured by Mitsubishi Engineering-Plastics Corporation) were stirred at a temperature 30 degrees C. higher than the melting point and thereafter drawn into a fibrous form using a nozzle having an orifice of a circular form. The number of fibers coming out of the nozzle was set to 100, the draw ratio was set to about 3 times, and fiber containing a stretched thermoplastic resin having a fiber diameter of 50 μm was obtained.

The long fiber bundles obtained by cutting the obtained fiber were arranged by hand in a mold in which a metal sheet was placed in advance in a mold form having a width of about 500 mm in such a manner that the fiber was aligned to obtain a uniform thickness. Thereafter, another metal sheet was put into the framewaork from the top so that the long fiber bundle was sandwiched between the two metal sheets, and thereafter the entire mold was moved to a heat press (HP) (KU-HCP 33, manufactured by KOBAYASHI KIKAI KOGYO Co., Ltd.).

Next, the heat press was set to a temperature of 150 degrees C. and a pressure of 1.5 MPa and the mold was subjected to heat-pressing for 10 minutes to obtain fiber aggregation having a sheet-like form formed of fiber. After the heat-pressing, a smooth sheet-like fiber aggregation was taken out from the mold while controlling the temperature and pressure. When the sheet-like fiber aggregation was taken out from the mold, each fiber was aligned, the fiber was confirmed to be firmly attached to each other, and was not easily bent or dented when held by hand. Further, fiber aggregation was placed on a flat place to check whether the fiber aggregation was warped. The float at the end of the fiber aggregation was about 1 mm, that is, there was almost no warp.

Next, porosity of the obtained fiber aggregation was measured in the following manner and was 50 percent by mass. Moreover, the surface roughness Ra of the obtained fiber aggregation was measured in the direction perpendicular to the fiber arrangement direction and the direction parallel to the fiber arrangement direction) in the following manner and the ratio (X/Y, where X represents Ra in the perpendicular direction to the fiber arrangement direction and Y represents Ra in the parallel direction to the fiber arrangement direction) was measured to be 1.12.

Measurement of Porosity

Porosity of the fiber aggregation was calculated by the volume and the mass of the fiber aggregation. Using a ruler, the height, the width, and the depth of the fiber aggregation were measured and multiplied to calculate the volume of the fiber aggregation. The mass of the fiber aggregation was divided by the volume of the fiber aggregation to obtain the density of the fiber aggregation. The density of the fiber aggregation was subtracted from the true density (1.31) of the resin (PBT) and the result was divided by the true density of the resin to calculate the porosity (percent by volume) of the fiber aggregation.

Measurement of Ratio (X/Y) of Surface Roughness Ra

The surface Roughness Ra of the fiber aggregation was measured using a three-dimensional surface roughness measuring device (VR-3200, manufactured by Keyence Corporation). The fiber aggregation was placed on the measuring board and representative fiber was selected and the surface roughness Ra of the fiber in the fiber axis direction was defined as Y and the surface roughness Ra of the fiber in the direction perpendicular to the fiber axis direction was defined as X. Each of X and Y were measured three times and the average was calculated to obtain the ratio (X/Y).

Example 2

The PBT fiber (fiber diameter of 52 µm) manufactured in the same manner as in Example 1 was set in the heat press at a temperature of 180 degrees C. and a pressure of 1.5 MPa and heat-pressed for 10 minutes to obtain a sheet-like fiber aggregation formed of fiber. After the heat-pressing, a smooth sheet-like fiber aggregation in which each fiber was aligned was taken out from the mold while controlling the temperature and pressure.

Next, porosity of the obtained fiber aggregation was measured in the same manner as in Example 1. The porosity was 38 percent by volume. Moreover, the surface roughness Ra of the obtained fiber aggregation was measured in the same manner as in Example 1 to obtain the ratio (X/Y), which was 1.16.

Example 3

The PBT fiber (fiber diameter of 52 µm) manufactured in the same manner as in Example 1 was set in the heat press at a temperature of 180 degrees C. and a pressure of 1.2 MPa and heat-pressed for 10 minutes to obtain a sheet-like fiber aggregation formed of fiber. After the heat-pressing, a smooth sheet-like fiber aggregation in which each fiber was aligned was taken out from the mold while controlling the temperature and pressure.

Porosity of this fiber aggregation was measured in the same manner as in Example 1. The porosity was 32 percent by volume. Moreover, the surface roughness Ra of the obtained fiber aggregation was measured in the same manner as in Example 1 to obtain the ratio (X/Y), which was 1.19.

Example 4

The PBT fiber (fiber diameter of 48 µm) manufactured in the same manner as in Example 1 was set in the heat press at a temperature of 180 degrees C. and a pressure of 2.0 MPa and heat-pressed for 10 minutes to obtain a sheet-like fiber aggregation formed of fiber. After the heat-pressing, a smooth sheet-like fiber aggregation in which each fiber was aligned was taken out from the mold while controlling the temperature and pressure.

Next, porosity of the obtained fiber aggregation was measured in the same manner as in Example 1. The porosity was 28 percent by volume. Moreover, the surface roughness Ra of the obtained fiber aggregation was measured in the same manner as in Example 1 to obtain the ratio (X/Y), which was 1.17.

Example 5

The PBT fiber (fiber diameter of 45 µm) manufactured in the same manner as in Example 1 was set in the heat press at a temperature of 200 degrees C. and a pressure of 2.0 MPa and heat-pressed for 10 minutes to obtain a sheet-like fiber aggregation formed of fiber. After the heat-pressing, a smooth sheet-like fiber aggregation in which each fiber was aligned was taken out from the mold while controlling the temperature and pressure.

Next, porosity of the obtained fiber aggregation was measured in the same manner as in Example 1. The porosity was 15 percent by volume. Moreover, the surface roughness Ra of the obtained fiber aggregation was measured in the same manner as in Example 1 to obtain the ratio (X/Y), which was 1.16.

Example 6

The PBT fiber (fiber diameter of 2 µm) manufactured in the same manner as in Example 1 except that the nozzle orifice during fiber manufacturing was changed and set in the heat press at a temperature of 200 degrees C. and a pressure of 2.0 MPa and heat-pressed for 10 minutes to obtain a sheet-like fiber aggregation formed of fiber. After the heat-pressing, a smooth sheet-like fiber aggregation in which each fiber was aligned was taken out from the mold while controlling the temperature and pressure.

Next, porosity of the obtained fiber aggregation was measured in the same manner as in Example 1. The porosity was 20 percent by volume. Moreover, the surface roughness Ra of the obtained fiber aggregation was measured in the same manner as in Example 1 to obtain the ratio (X/Y), which was 1.14.

Example 7

The PBT fiber (fiber diameter of 140 μm) manufactured in the same manner as in Example 1 except that the nozzle orifice during fiber manufacturing was changed and set in the heat press at a temperature of 200 degrees C. and a pressure of 2.0 MPa and heat-pressed for 10 minutes to obtain a sheet-like fiber aggregation formed of fiber. After the heat-pressing, a smooth sheet-like fiber aggregation in which each fiber was aligned was taken out from the mold while controlling the temperature and pressure.

Next, porosity of the obtained fiber aggregation was measured in the same manner as in Example 1. The porosity was 21 percent by volume. Moreover, the surface roughness Ra of the obtained fiber aggregation was measured in the same manner as in Example 1 to obtain the ratio (X/Y), which was 1.15.

Example 8

The PBT fiber (fiber diameter of 0.9 μm) manufactured in the same manner as in Example 1 except that the nozzle orifice during fiber manufacturing was changed and set in the heat press at a temperature of 200 degrees C. and a pressure of 2.0 MPa and heat-pressed for 10 minutes to obtain a sheet-like fiber aggregation formed of fiber. After the heat-pressing, a smooth sheet-like fiber aggregation in which each fiber was aligned was taken out from the mold while controlling the temperature and pressure.

Next, porosity of the obtained fiber aggregation was measured in the same manner as in Example 1. The porosity was 18 percent by volume. Moreover, the surface roughness Ra of the obtained fiber aggregation was measured in the same manner as in Example 1 to obtain the ratio (X/Y), which was 1.10.

Example 9

The PBT fiber (fiber diameter of 155 μm) manufactured in the same manner as in Example 1 except that the nozzle orifice during fiber manufacturing was changed and set in the heat press at a temperature of 200 degrees C. and a pressure of 2.0 MPa and heat-pressed for 10 minutes to obtain a sheet-like fiber aggregation formed of fiber. After the heat-pressing, a smooth sheet-like fiber aggregation in which each fiber was aligned was taken out from the mold while controlling the temperature and pressure.

Next, porosity of the obtained fiber aggregation was measured in the same manner as in Example 1. The porosity was 27 percent by volume. Moreover, the surface roughness Ra of the obtained fiber aggregation was measured in the same manner as in Example 1 to obtain the ratio (X/Y), which was 1.11.

Example 10

The PBT fiber (fiber diameter of 48 μm) manufactured in the same manner as in Example 1 was set in a mold, dipped in a polyvinyl alcohol (PVA) aqueous solution (concentration of 50 percent by mass), and held at 120 degrees C. in a vacuum state for 10 hours to solidify the fiber to make each fiber aligned to obtain a smooth sheet-like fiber aggregation.

Next, porosity of the obtained fiber aggregation was measured in the same manner as in Example 1. The porosity was 5 percent by volume. Moreover, the surface roughness Ra of the obtained fiber aggregation was measured in the same manner as in Example 1 to obtain the ratio (X/Y), which was 1.17.

Example 11

The PBT fiber (fiber diameter of 48 μm) manufactured in the same manner as in Example 1 was cut and thereafter placed in advance in a mold form having a width of about 500 mm in such a manner that the fiber was aligned by hand followed by aligning with a comb having a gap of 5 mm to obtain a uniform thickness. Next, the heat press was set to a temperature of 200 degrees C. and a pressure of 2.0 MPa and the mold was subjected to heat-pressing for 10 minutes to obtain fiber aggregation having a sheet-like form formed of fiber. After the heat-pressing, a smooth sheet-like fiber aggregation in which each fiber was aligned was taken out from the mold while controlling the temperature and pressure.

Next, porosity of the obtained fiber aggregation was measured in the same manner as in Example 1. The porosity was 21 percent by volume. Moreover, the surface roughness Ra of the obtained fiber aggregation was measured in the same manner as in Example 1 to obtain the ratio (X/Y), which was 1.32.

Example 12

The PBT fiber (fiber diameter of 56 μm) manufactured in the same manner as in Example 1 was cut and thereafter placed in advance in a mold form having a width of about 500 mm in such a manner that the fiber was aligned by hand followed by careful aligning with a comb having a gap of 4 mm to obtain a uniform thickness. Next, the heat press was set to a temperature of 200 degrees C. and a pressure of 2.0 MPa and the mold was subjected to heat-pressing for 10 minutes to obtain fiber aggregation having a sheet-like form formed of fiber. After the heat-pressing, a smooth sheet-like fiber aggregation in which each fiber was aligned was taken out from the mold while controlling the temperature and pressure.

Next, porosity of the obtained fiber aggregation was measured in the same manner as in Example 1. The porosity was 20 percent by volume. Moreover, the surface roughness Ra of the obtained fiber aggregation was measured in the same manner as in Example 1 to obtain the ratio (X/Y), which was 1.45.

Example 13

The PBT fiber (fiber diameter of 48 μm) manufactured in the same manner as in Example 1 was cut and thereafter placed in advance in a mold form having a width of about 500 mm in such a manner that the fiber was aligned by hand followed by careful aligning with a comb having a gap of 3 mm to obtain a uniform thickness. Next, the heat press was set to a temperature of 200 degrees C. and a pressure of 2.0 MPa and the mold was subjected to heat-pressing for 10 minutes to obtain fiber aggregation having a sheet-like form formed of fiber. After the heat-pressing, a smooth sheet-like fiber aggregation in which each fiber was aligned was taken out from the mold while controlling the temperature and pressure.

Next, porosity of the obtained fiber aggregation was measured in the same manner as in Example 1. The porosity was 20 percent by volume. Moreover, the surface roughness Ra of the obtained fiber aggregation was measured in the same manner as in Example 1 to obtain the ratio (X/Y), which was 1.61.

Example 14

The PBT fiber (fiber diameter of 50 μm) manufactured in the same manner as in Example 1 was cut and thereafter placed in advance in a mold form having a width of about 500 mm in such a manner that the fiber was aligned by hand followed by careful aligning with a comb having a gap of 2 mm to obtain a uniform thickness. Next, the heat press was set to a temperature of 200 degrees C. and a pressure of 2.0 MPa and the mold was subjected to heat-pressing for 10 minutes to obtain fiber aggregation having a sheet-like form formed of fiber. After the heat-pressing, a smooth sheet-like fiber aggregation in which each fiber was aligned was taken out from the mold while controlling the temperature and pressure.

Next, porosity of the obtained fiber aggregation was measured in the same manner as in Example 1. The porosity was 21 percent by volume. Moreover, the surface roughness Ra of the obtained fiber aggregation was measured in the same manner as in Example 1 to obtain the ratio (X/Y), which was 1.73.

Example 15

Glass beads (Ballotini glass beads GB731, manufactured by Potters-Ballotini Co., Ltd.) were added to the PBT fiber (fiber diameter of 50 μm) manufactured in the same manner as in Example 1. The PBT fiber was cut and thereafter placed in advance in a mold form having a width of about 500 mm in such a manner that the fiber was aligned by hand followed by careful aligning with a comb having a gap of 2 mm to obtain a uniform thickness. Next, the heat press was set to a temperature of 200 degrees C. and a pressure of 2.0 MPa and the mold was subjected to heat-pressing for 10 minutes to obtain fiber aggregation having a sheet-like form of fiber. After the heat-pressing, a smooth sheet-like fiber aggregation in which each fiber was aligned was taken out from the mold while controlling the temperature and pressure.

Next, porosity of the obtained fiber aggregation was measured in the same manner as in Example 1. The porosity was 20 percent by volume. Moreover, the surface roughness Ra of the obtained fiber aggregation was measured in the same manner as in Example 1 to obtain the ratio (X/Y), which was 1.55.

Example 16

A PP fiber (fiber diameter of 55 μm) was manufactured in the same manner as in Example 1 except that the PBT resin used in Example 1 was changed to PP resin (J704UG, manufactured by Prime Polymer Co., Ltd.). The PP fiber was cut and thereafter placed in advance in a mold form having a width of about 500 mm in such a manner that the fiber was aligned by hand followed by careful aligning with a comb having a gap of 2 mm to obtain a uniform thickness. Next, the heat press was set to a temperature of 100 degrees C. and a pressure of 1.5 MPa and the mold was subjected to heat-pressing for 10 minutes to obtain fiber aggregation having a sheet-like form formed of fiber. After the heat-pressing, a smooth sheet-like fiber aggregation in which each fiber was aligned was taken out from the mold while controlling the temperature and pressure.

Next, porosity of the obtained fiber aggregation was measured in the same manner as in Example 1. The porosity was 20 percent by volume. Moreover, the surface roughness Ra of the obtained fiber aggregation was measured in the same manner as in Example 1 to obtain the ratio (X/Y), which was 1.75.

Example 17

Manufacturing of Short Fiber

The fiber aggregation manufactured in the same conditions as in Example 14 was attached to the feed plate of an automatic push-cut type cutting device (NJ series 1200 type, manufactured by OGINO SEIKI CO., LTD.) with a double-sided tape and cut with a cut length of 60 μm with a shot number of 280 shots to obtain a resin powder. The thus-obtained short fiber containing coarse short fiber was subjected to a treatment using a pulverizer (MP type mixer MP5A/1, manufactured by NIPPON COKE & ENGINEERING CO., LTD.) followed by stirring at a stirring speed of 9,600 rpm for 10 minutes to obtain short fiber having a length of 60 μm. A smooth sheet-like fiber aggregation in which each fiber was aligned was taken out from the mold in the same manner as in Example 14.

Next, porosity of the obtained fiber aggregation was measured in the same manner as in Example 1. The porosity was 21 percent by volume. Moreover, the surface roughness Ra of the obtained fiber aggregation was measured in the same manner as in Example 1 to obtain the ratio (X/Y), which was 1.73.

Example 18

The PBT fiber (fiber diameter of 50 μm) manufactured in the same manner as in Example 1 was cut and thereafter placed in advance in a mold form having a width of about 500 mm in such a manner that the fiber was aligned by hand followed by careful aligning with a comb having a gap of 2 mm to obtain a uniform thickness. Next, the heat press was set to a temperature of 210 degrees C. and a pressure of 2.5 MPa and the mold was subjected to heat-pressing for 10 minutes to obtain fiber aggregation having a sheet-like form formed of fiber. After the heat-pressing, a smooth sheet-like fiber aggregation in which each fiber was aligned was taken out from the mold while controlling the temperature and pressure.

Next, porosity of the obtained fiber aggregation was measured in the same manner as in Example 1. The porosity was 5 percent by volume. Moreover, the surface roughness Ra of the obtained fiber aggregation was measured in the same manner as in Example 1 to obtain the ratio (X/Y), which was 1.75.

Manufacturing of Film

The obtained fiber aggregation was attached to a feed plate of an automatic push-cut type cutting device (NJ series 1200 type, manufactured by OGINO SEIKI CO., LTD.) with a double-sided tape and cut with a cut length of 100 μm to obtain a film (thermoplastic resin film) having a width of 100 μm in which fiber was bound to each other.

Comparative Example 1

Porosity of the non-woven fabric (BTF0050SR, fiber diameter of 1.6 μm, manufactured by Kuraray Kuraflex Co., Ltd.) made of PBT resin was measured in the same manner as in Example 1. The porosity was 96 percent by volume. Moreover, the surface roughness of the obtained fiber aggregation was measured in the same manner as in Example 1. The porosity was too high to measure the surface roughness with the surface roughness measuring device mentioned above).

Comparative Example 2

The PBT fiber (fiber diameter of 48 μm) manufactured in the same manner as in Example 1 was woven using a table-top weaving machine to manufacture a PBT fiber woven fabric. Porosity of this fiber fabric was measured in the same manner as in Example 1. The porosity was 86 percent by volume. Moreover, the surface roughness of the obtained fiber aggregation was measured in the same manner as in Example 1. The porosity was too high to measure the surface roughness with the surface roughness measuring device mentioned above).

Comparative Example 3

The PBT fiber (fiber diameter of 51 μm) manufactured in the same manner as in Example 1 was knitted using a knitting machine to manufacture a PBT fiber knitting fabric. Porosity of this fiber fabric was measured in the same manner as in Example 1. The porosity was 88 percent by volume. Moreover, the surface roughness of the obtained fiber aggregation was measured in the same manner as in Example 1. The porosity was too high to measure the surface roughness with the surface roughness measuring device mentioned above).

Next, the obtained fiber aggregations of Examples 1 to 17 and Comparative Examples 1 to 3 were attached to a feed plate of an automatic push-cut type cutting device (NJ series 1200 type, manufactured by OGINO SEIK1 CO., LTD.) with a double-sided tape. For each short fiber obtained by cutting with an arbitrary cutting width, mean volume diameter (Mv), mean number diameter (Mn), Mv/Mn, variation in cutting dimensions, and marginal cut width were evaluated. The results are shown in Table 2.

Variation of Cutting Dimensions

The fiber aggregation manufactured in each condition was cut with a cutting width of 150 μm and 2,000 shots with a new blade (PN206, manufactured by OGINO SEMI CO., LTD.). For the obtained short fibers, mean volume diameter (Mv), mean number diameter (Mn), and the ratio (Mv/Mn) were measured to evaluate variation of cutting dimensions.

Mean Volume Diameter (Mv), Mean Number Diameter (Mn), and Ratio (Mv/Mn)

Using a particle size distribution measuring device (microtrac MT3300EXII, manufactured by MicrotracBEL Corp.) and the short fiber refractive index of short fiber, the mean volume diameter (Mv) and the mean number diameter (Mn) were measured according to a dry (atmosphere) method without using a solvent. The short fiber refractive index of the polybutylene terephthalate (PBT) resin was set to 1.57. The ratio (Mv/Mn) was calculated by dividing Mv by Mn.

When the ratio (Mv/Mn) was less than 1.50, the variation of cutting dimensions was small and practically allowable.

Marginal Cut Width

When the fiber aggregation manufactured in each condition was cut, the cut width setting value was gradually narrowed from 100 μm to calculate the ratio (Mv/Mn) of the obtained short fibers. When the value was 1.50 or more, the cutting width setting value of the device was identified as the marginal cut width (μm). A new blade (PN206, manufactured by OGINO SEMI CO., LTD.) was used every cutting and the short fibers obtained by cutting with a total of 2,000 shots were evaluated.

In addition, as the marginal cut width decreases, the fiber length of the short fiber is shortened.

TABLE 1

| | HP temperature (degrees C.) | HP pressure (MPa) | HP time (min) | Form | Resin | Additive | Form | Attachment method between fibers |
|---|---|---|---|---|---|---|---|---|
| Example 1 | 150 | 1.5 | 10 | Fiber aggregation | PBT | None | Sheet | Fusion |
| Example 2 | 180 | 1.5 | 10 | Fiber aggregation | PBT | None | Sheet | Fusion |
| Example 3 | 180 | 1.2 | 10 | Fiber aggregation | PBT | None | Sheet | Fusion |
| Example 4 | 180 | 2.0 | 10 | Fiber aggregation | PBT | None | Sheet | Fusion |
| Example 5 | 200 | 2.0 | 10 | Fiber aggregation | PBT | None | Sheet | Fusion |
| Example 6 | 200 | 2.0 | 10 | Fiber aggregation | PBT | None | Sheet | Fusion |
| Example 7 | 200 | 2.0 | 10 | Fiber aggregation | PBT | None | Sheet | Fusion |
| Example 8 | 200 | 2.0 | 10 | Fiber aggregation | PBT | None | Sheet | Fusion |
| Example 9 | 200 | 2.0 | 10 | Fiber aggregation | PBT | None | Sheet | Fusion |
| Example 10 | None | None | None | Fiber aggregation | PBT | None | Sheet | PVA |
| Example 11 | 200 | 2.0 | 10 | Fiber aggregation | PBT | None | Sheet | Fusion |
| Example 12 | 200 | 2.0 | 10 | Fiber aggregation | PBT | None | Sheet | Fusion |
| Example 13 | 200 | 2.0 | 10 | Fiber aggregation | PBT | None | Sheet | Fusion |
| Example 14 | 200 | 2.0 | 10 | Fiber aggregation | PBT | None | Sheet | Fusion |

TABLE 1-continued

|  | HP temperature (degrees C.) | HP pressure (MPa) | HP time (min) | Form | Resin | Additive | Form | Attachment method between fibers |
|---|---|---|---|---|---|---|---|---|
| Example 15 | 200 | 2.0 | 10 | Fiber aggregation | PBT | Glass bead | Sheet | Fusion |
| Example 16 | 100 | 1.5 | 10 | Fiber aggregation | PP | None | Sheet | Fusion |
| Example 17 | 200 | 2.0 | 10 | Fiber aggregation | PBT | None | Sheet | Fusion |
| Example 18 | 210 | 2.5 | 10 | Fiber aggregation | PBT | None | Sheet | Fusion |
| Comparative Example 1 | — | — | — | Non-woven fabric | PBT | None | Sheet | Binder |
| Comparative Example 2 | — | — | — | Woven fabric | PBT | None | Sheet | None |
| Comparative Example 3 | — | — | — | Knitted fabric | PBT | None | Sheet | None |

HP temperature: Heat press temperature
HP pressure: Heat press pressure
HP time: Heat press time

TABLE 2

|  | Porosity (percent by volume) | Fiber diameter (μm) | Ratio of surface roughness Ra (X/Y) | Mv (μm) | Mn (μm) | Mv/Mn | Marginal cutting width (μm) |
|---|---|---|---|---|---|---|---|
| Example 1 | 50 | 50 | 1.12 | 98.2 | 65.9 | 1.49 | 85 |
| Example 2 | 38 | 52 | 1.16 | 90.0 | 65.2 | 1.38 | 88 |
| Example 3 | 32 | 52 | 1.19 | 82.0 | 60.7 | 1.35 | 55 |
| Example 4 | 28 | 48 | 1.17 | 80.0 | 60.6 | 1.32 | 50 |
| Example 5 | 15 | 45 | 1.16 | 80.0 | 61.1 | 1.31 | 20 |
| Example 6 | 20 | 2 | 1.14 | 3.0 | 2.3 | 1.30 | 20 |
| Example 7 | 21 | 140 | 1.15 | 160.0 | 118.5 | 1.35 | 20 |
| Example 8 | 18 | 0.9 | 1.10 | 2.0 | 1.6 | 1.25 | 15 |
| Example 9 | 27 | 155 | 1.11 | 180.0 | 132.4 | 1.36 | 55 |
| Example 10 | 5 | 48 | 1.17 | 60.0 | 52.2 | 1.15 | 50 |
| Example 11 | 21 | 48 | 1.32 | 62.0 | 49.6 | 1.25 | 25 |
| Example 12 | 20 | 56 | 1.45 | 65.0 | 51.6 | 1.26 | 20 |
| Example 13 | 20 | 48 | 1.61 | 59.0 | 52.2 | 1.13 | 15 |
| Example 14 | 21 | 50 | 1.73 | 61.0 | 53.0 | 1.15 | 15 |
| Example 15 | 20 | 50 | 1.55 | 65.0 | 57.5 | 1.13 | 20 |
| Example 16 | 20 | 55 | 1.75 | 65.0 | 58.0 | 1.12 | 20 |
| Example 17 | 21 | 50 | 1.73 | 55.0 | 48.2 | 1.14 | 15 |
| Example 18 | 5 | 50 | 1.75 | — | — | — | — |
| Comparative Example 1 | 96 | 1.6 | — | 20.0 | 11.0 | 1.82 | Impossible |
| Comparative Example 2 | 86 | 48 | — | 90.0 | 51.4 | 1.75 | Impossible |
| Comparative Example 3 | 88 | 51 | — | 92.0 | 53.5 | 1.72 | Impossible |

Aspects of the present disclosure are, for example, as follows.

1. A fiber aggregation contains fiber containing a thermoplastic resin, each of the fiber being mutually joined and aligned.

2. The fiber aggregation according to 1 mentioned above, wherein the fiber contains an additive.

3. The fiber aggregation according to 1 or 2 mentioned above, wherein each of the fiber is joined by fusion.

4. The fiber aggregation according to any one of 1 to 3 mentioned above, wherein the fiber aggregation has a sheet-like form.

5. The fiber aggregation according to any one of 1 to 4 mentioned above, wherein the fiber aggregation has a porosity of 40 percent by volume or less.

6. The fiber aggregation according to any one of 1 to 5 mentioned above, wherein the fiber aggregation has a porosity of 30 percent by volume or less.

7. The fiber aggregation according to any one of 1 to 6 mentioned above, wherein the fiber has a fiber diameter of from 1 to 150 μm.

8. The fiber aggregation according to any one of 1 to 7 mentioned above, wherein the fiber aggregation contains only fiber.

9. The fiber aggregation according to any one of 1 to 8 mentioned above, wherein the ratio (X/Y) is 1.2 or greater, where X represents the surface roughness Ra of the fiber aggregation in the fiber axis direction and Y represents the surface roughness Ra of the fiber aggregation in the fiber diameter direction.

10. The fiber aggregation according to any one of 1 to 9 mentioned above, wherein the ratio (X/Y) is 1.5 or greater, where X represents the surface roughness Ra of the fiber aggregation in the fiber axis direction and Y represents the surface roughness Ra of the fiber aggregation in the fiber diameter direction.

11. The fiber aggregation according to any one of 1 to 10 mentioned above, wherein the fiber aggregation is manufactured by a heat press method.

12. The fiber aggregation according to any one of 1 to 11 mentioned above, wherein the thermoplastic resin is at least one member selected from the group consisting of polyolefin, polyamide, polyester, polyether, polyarylketone, a liquid crystal polymer, polyacetal, polyimide, a fluorochemical resin, and polyolefin sulfide.

13. The fiber aggregation according to any one of 2 to 12 mentioned above, wherein the additive contains at least one member selected from the group consisting of an antioxidant, a flame retardant, an inorganic reinforcing agent, a fluidizing agent, a plasticizer, and a crystal nucleating agent.

14. A short fiber obtained by cutting the fiber aggregation of any one of 1 to 13 mentioned above.

15. The short fiber according to 14 mentioned above, wherein the ratio (Mv/Mn) of the mean volume diameter Mv to the mean number diameter Mn is 1.5 or less.

16. A film obtained by cutting the fiber aggregation of any one of 1 to 13 mentioned above.

17. A method of manufacturing short fiber includes mutually joining fiber containing at least a thermoplastic resin to manufacture a fiber aggregation and cutting the fiber aggregation to a desired size to obtain short fiber.

18. The method according to 17 mentioned above, wherein the fiber is mutually joined by a heat press method, where the heating temperature is set at 15 degrees C. or more below the melting point of the thermoplastic resin.

19. The method of manufacturing a film includes mutually joining fiber containing a thermoplastic resin to manufacture a fiber aggregation and cutting the fiber aggregation to a desired size to obtain a film.

20. The method according to 19 mentioned above, wherein the fiber is mutually joined by a heat press method and the heating temperature is set at the melting point of the thermoplastic resin or lower.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. A method of manufacturing short fiber comprising:
mutually joining fiber comprising a thermoplastic resin to manufacture a fiber aggregation; and
cutting the fiber aggregation into short fiber having a ratio of a mean volume diameter to a mean number diameter of 1.5 or less,
wherein the short fiber has a fiber diameter of from 1 to 150 μm,
wherein the mean volume diameter of the short fiber is 150 μm or less, and
wherein the fiber aggregation has a porosity of 5 to 25 percent by volume.

2. The method according to claim 1, wherein the ratio of the mean volume diameter to the mean number diameter of the short fiber is 1.2 or less.

3. The method according to claim 1, wherein the fiber aggregation consists of the thermoplastic resin fibers.

4. The method according to claim 1, wherein the fiber aggregation comprises the fiber and an adhesive.

5. The method according to claim 1, wherein the fiber aggregation has a sheet-like form.

6. The method according to claim 1, wherein the fiber aggregation has a porosity of from 5 to 21 percent by volume.

7. The method according to claim 1, wherein the fiber has a solid cross-section.

8. The method according to claim 1, wherein the fiber comprising the thermoplastic resin is obtained by a process comprising drawing the thermoplastic resin into a fibrous form using a nozzle having a circular orifice.

9. The method according to claim 1, wherein a ratio (X/Y) is 1.2 or greater, wherein X represents a surface roughness Ra of the fiber aggregation in a fiber axis direction and Y represents a surface roughness Ra of the fiber aggregation in a fiber diameter direction.

10. The method according to claim 1, wherein the fiber is mutually joined by a heat press method, where a heating temperature is set 15 degrees C. or more below a melting point of the thermoplastic resin.

11. The method according to claim 10, wherein the fibers are placed in a mold during the heat press method.

12. The method according to claim 10, wherein the heat press method includes placing the fibers in a heat press device including a pair of heating plates each including a heater inside thereof.

13. A method of manufacturing a film comprising:
mutually joining fiber comprising a thermoplastic resin to manufacture a fiber aggregation; and
cutting the fiber aggregation into the film comprising an aggregation of fibers having a ratio of a mean volume diameter to a mean number diameter of 1.5 or less,
wherein the fiber has a fiber diameter of from 1 to 150 μm, and
wherein the fiber aggregation has a porosity of 5 to 25 percent by volume.

14. The method according to claim 13, wherein the fiber is mutually joined by a heat press method, where a heating temperature is set at a melting point of the thermoplastic resin or lower.

15. The method according to claim 14, wherein the fibers are placed in a mold during the heat press method.

16. The method according to claim 14, wherein the heat press method includes placing the fibers in a heat press device including a pair of heating plates each including a heater inside thereof.

17. The method according to claim 13, wherein the fiber aggregation consists of the thermoplastic resin fibers.

18. The method according to claim 13, wherein the fiber aggregation comprises the fiber and an adhesive.

19. The method according to claim 13, wherein the fiber aggregation has a sheet-like form.

20. The method according to claim 13, wherein a ratio (X/Y) is 1.2 or greater, wherein X represents a surface roughness Ra of the fiber aggregation in a fiber axis direction and Y represents a surface roughness Ra of the fiber aggregation in a fiber diameter direction.

* * * * *